(12) United States Patent
Hartford et al.

(10) Patent No.: US 11,313,467 B1
(45) Date of Patent: Apr. 26, 2022

(54) PISTON RING SEALS

(71) Applicant: TOTAL SEAL, INC., Phoenix, AZ (US)

(72) Inventors: Matthew Hartford, Scottsdale, AZ (US); Keith A. Jones, Phoenix, AZ (US)

( * ) Notice: Subject to any disclaimer, the term of this patent is extended or adjusted under 35 U.S.C. 154(b) by 0 days.

(21) Appl. No.: 17/154,660

(22) Filed: Jan. 21, 2021

(51) Int. Cl.
*F16J 9/20* (2006.01)
*F16J 9/22* (2006.01)
*F02F 5/00* (2006.01)

(52) U.S. Cl.
CPC .. *F16J 9/20* (2013.01); *F16J 9/22* (2013.01)

(58) Field of Classification Search
CPC . F16J 9/20; F16J 9/22; F16J 9/02; F02F 5/00
See application file for complete search history.

(56) References Cited

U.S. PATENT DOCUMENTS

| | | | |
|---|---|---|---|
| 1,365,348 A | 1/1921 | Shelter | |
| 1,369,989 A | 3/1921 | Sullivan | |
| 1,771,198 A | 7/1930 | Walter | |
| 1,936,430 A | 11/1933 | Godron | |
| 2,112,103 A | 3/1938 | Kottusch | |
| 2,372,979 A | 3/1945 | Phillips | |
| 3,396,976 A | 8/1968 | Reinhoudt et al. | |
| 3,586,338 A | 6/1971 | Miklau | |
| 3,735,992 A | 5/1973 | Prostorov et al. | |
| 4,474,147 A | 10/1984 | Hoopes | |
| 4,518,168 A | 5/1985 | Belter | |
| RE32,395 E * | 4/1987 | Geffroy | F16J 9/16 123/193.6 |
| 4,796,897 A | 1/1989 | Inciong | |
| 5,253,877 A * | 10/1993 | DeBiasse | F16J 9/06 277/437 |
| 5,341,779 A | 8/1994 | Chen et al. | |
| 5,618,048 A * | 4/1997 | Moriarty | F01L 3/08 277/489 |
| 5,895,054 A | 4/1999 | Miyaoh et al. | |
| 6,719,301 B2 | 4/2004 | Chen et al. | |
| 6,899,595 B2 | 5/2005 | Moriarty et al. | |
| 8,555,850 B2 * | 10/2013 | Ma | F16J 9/20 123/193.6 |
| 9,334,959 B2 | 5/2016 | Hartford et al. | |
| 10,871,228 B2 * | 12/2020 | Ruch | F16J 9/06 |
| 2006/0220322 A1 * | 10/2006 | McCormick | F16J 9/22 277/442 |
| 2020/0191269 A1 * | 6/2020 | Radunzel | F16J 9/08 |

* cited by examiner

*Primary Examiner* — Grant Moubry
(74) *Attorney, Agent, or Firm* — Parsons & Goltry, PLLC; Michael W. Goltry; Robert A. Parsons

(57) ABSTRACT

A seal assembly includes a tensionable annular member and a gap seal annular member that are axially juxtaposed and configured to be carried by one of a pair of coaxially movable components for sealingly engaging another one of the pair of components. The tensionable annular member includes first and second radial surfaces, an inner surface, and an outer contact surface. Rounded bottom grooves are formed across the first radial surface from the outer contact surface to the inner surface. In another embodiment, notches are formed across the inner surface from the first radial surface to the second radial surface.

20 Claims, 13 Drawing Sheets

PISTON RING SEALS

FIELD OF THE INVENTION

The present invention relates generally to seals and, more particularly, annular seals for minimizing fluid leakage between reciprocally movable members, particularly a piston and a cylinder assembly, and for reducing emissions, improving fuel economy, and decreasing oil consumption in internal combustion engines.

BACKGROUND OF THE INVENTION

Various mechanical assemblies include first and second members, which are substantially coaxial and configured for relative reciprocal movement. Exemplary are internal combustion engines, positive displacement pumps, pneumatic motors, and other mechanical devices incorporating a piston and a cylinder assembly. Other examples will occur to the skilled artisan.

Commonly, the cylinder includes a cylindrical sidewall defining a bore. The piston is a generally cylindrical member, including a sidewall and a top. An end wall or head opposing the top of the piston closes one end of the bore. The bore defines a chamber of variable capacity between the head and the top of the piston. Pressurized fluid operates in the chamber. In an internal combustion engine, the fluid is the expanding gas of combustion, which ignites and propels the piston away from the head. An external source applies pressurized fluid into the chamber in a pneumatic motor to force piston movement. In a pump, which is a companion to the engine and to the pneumatic motor, fluid is compressed and pressurized in the chamber.

The piston diameter is less than the bore diameter to enable relative movement between the members. Frequently, substantial clearance is required. For example, a piston is more sensitive to thermal expansion than a cylinder. Accordingly, where heat is a factor, such as in an internal combustion engine, additional space between the bore sidewall and the piston sidewall accommodates the piston's thermal expansion. The sidewall clearance, the described space between the bore sidewall and the piston sidewall, is generally in the range of fifteen ten-thousandths of an inch to five one-thousandths of an inch or greater.

Conventionally, a piston ring seals the piston to the cylinder. A mating annular ring groove formed into the piston's sidewall receives the piston ring, an annular seal usually fabricated of cast iron or other chosen metal. An end gap that severs the piston ring to define spaced-apart ends enables the piston ring to expand during installation and for other reasons. The ring has an inherency to expand, allowing it to maintain constant tension for attendant sealing against the cylinder's sidewall as the bore increases in diameter caused by wear. The end gap also allows for thermal expansion of the piston ring resulting from heat generated by friction, fluid compression, fuel combustion, and other sources.

Efficiency, economy, and service life of the apparatus are directly related to blow-by. In general, less than an optimum output of the apparatus results from a loss of pressure or fluid compression. Other harmful effects are unique to the apparatus. For example, contamination by-products of combustion suspended in the blow-by gases carried into the lubricating system in some internal combustion engines harm engine components and produce an attendant power loss. Piston rings that fail to seal the pistons to the cylinders causing the attendant blow-by can reduce an internal combustion engine's power by up to forty percent depending on the engine's displacement, compression ratio, and speed.

In recognition of the desirability of enhancing the seal between the piston and the cylinder, the prior art provides various seals, which purportedly reduce or eliminate blow-by. Several prior art proposals are direct attempts to eliminate the end gap in the conventional piston ring. Various proposals include a notch formed into the ring on either side of the end gap that receives an insert, which spans the end gap. Other proposals include a relatively thin steel member, alternately named a ribbon member or a gap seal member, having a substantially rectangular cross-section. Also advanced is a plurality of severed annular members, installed in a stacked arrangement with staggered end gaps. Also within the prior art are thin steel members, colloquially dubbed rails, in combination with ring members having a general resemblance to conventional piston rings. Being of substantially heavier construction than a rail and usually fabricated of malleable material, such as cast iron, the ring member operates as a packing member or a sealing ring. The combination of the ring member and the rail member forms a seal assembly of which various embodiments are known.

For various reasons, the seals described above are not entirely satisfactory. For example, excessive friction against the bore's sidewall occurs in the assembly where the rail resides within the seal member and exerts an expansive force. Seating or breaking-in of the seal is substantially retarded or even prohibited where only the rail contacts the sidewall. An angled rail is subject to vibration, commonly known as ring flutter, when used with a rapidly reciprocating piston. Seal assemblies of the preceding type tend to be inherently heavy and highly tensioned and prone to wear and produce cylinder distortion.

Efforts to improve upon piston rings by eliminating the end gap for stopping or reducing blow-by have disregarded more fundamental problems with known annular seals. The annular seal expands to maintain tension for attendant sealing against the bore's sidewall. However, the tension exerted against the bore's sidewall is often unnecessarily high, which results in unwanted and premature wear that can compromise the seal and lead to power loss and fuel inefficiency in internal combustion engines.

Another concern is piston ring tension. Piston ring tension includes tangential tension and unit tension or unit pressure. Tangential tension is the amount of force needed to squeeze the ring's ends together. In contrast, unit tension is the amount of pressure exerted by the ring's contact surface against the cylinder wall. In the 1970$s$, conventional piston rings had tangential tensions of up to thirty pounds, with from twenty-two to twenty-six pounds being standard. However, modern engines customarily use low compression rings, rated at from five to twelve pounds. Most aftermarket low tension rings have a somewhat higher tension than the original equipment (OE) rings they replace. For example, if an OE ring specification calls for six to twelve pounds, an aftermarket ring can have as much as twelve to sixteen pounds. Higher tension is needed because rings are often installed in oversized cylinders. Cylinder bores can also have more distortion than a new engine, so extra loading improves sealing.

Low tension piston rings reduce friction, which improves fuel economy and cylinder sealing. The amount of force the ring exerts against the cylinder wall, the unit pressure or unit tension, depends on tangential tension as well as ring thickness and cylinder bore diameter. Low tension rings are inherently thinner and exert less pressure against cylinder walls than conventional rings. Low tension piston rings, being thinner than standard piston rings, unfortunately tend to become distorted when exposed to extreme engine heat, which can compromise the seal with the cylinder resulting in blow-by, loss of power, and poor fuel economy. Furthermore, gas accumulation in the annular groove behind the piston ring expands the ring increasing friction between the piston ring and the cylinder's sidewall increasing the tendency of the ring to seize in the cylinder when overheated.

In view of at least these and other deficiencies inherent in the prior art, there is a need for improved piston ring seals that minimize fluid leakage between reciprocally movable members, that are selectively tensioned to reduce wear of the piston ring and the bore sidewall, and that resist distortion when exposed to extreme engine heat.

SUMMARY OF THE INVENTION

According to the principle of the invention, there is a seal assembly to be received within an annular groove having opposed radial surfaces and carried by one of a pair of relatively reciprocally movable members for sealing engagement with a sidewall of the other of said pair of relatively reciprocally movable members and for minimizing fluid leakage between said members. The seal assembly includes a tensionable annular member and a gap seal annular member. The tensionable annular member includes a first radial surface for residing adjacent to one of the radial surfaces of the groove, a second radial surface, an inner surface, an outer contact surface engageable with the sidewall, a first end gap severing the tensionable annular member and defining spaced-apart first and second ends thereof, a length from the first end to the second end, and grooves formed across the first radial surface from the outer contact surface to the inner surface of the tensionable annular member. The grooves are spaced-apart along the length of the tensionable annular member between the first end and the second end, and each groove is a rounded bottom. The gap seal annular member includes a first radial surface for residing in juxtaposition with the tensionable annular member, a second radial surface for residing adjacent to the other of the radial surfaces of the groove, an inner surface, an outer contact surface engageable with the sidewall, and a second gap severing the gap seal annular member and defining spaced-apart first and second ends thereof. The tensionable annular member includes an annular notch defined by a radial notch surface extending from the outer contact surface thereof to an inner notch surface extending from the second radial surface thereof, and the gap seal annular member is sized to be received in the annular notch. There is a first axial thickness between the first radial surface and the second radial surface, a second axial thickness between the first radial surface and the radial notch surface, the first axial thickness is greater than the second axial thickness, and each groove extends axially from the first radial surface into a) the first axial thickness from thirteen to fifteen percent of the first axial thickness and b) the second axial thickness from twenty-one to twenty-three percent of the second axial thickness. The rounded bottom of each groove has a groove depth and a groove radius, and the groove radius is greater than the groove depth. The outer contact surface of the gap seal annular member is more resistant to frictional wear than the outer contact surface of the tensionable annular member. The grooves are equally sized. In another embodiment there are notches formed across the inner surface of the tensionable annular member from the first radial surface to the second radial surface. The notches are spaced-apart along the length of the tensionable annular member between the first end and the second end thereof and each notch includes opposed first and second side surfaces that extend radially inward from the inner surface of the tensionable annular member to a blunt notch tip. There is a radial thickness between the inner surface of the tensionable annular member and the inner notch surface, and each notch extends radially from the inner surface of the tensionable annular member into the radial thickness no more than fifty percent of the radial thickness. There is a groove between adjacent notches, and the notches are equally sized. No one of the notches is in-line with, formed with, or intersects any one of the grooves.

According to the principle of the invention, there is a seal to be received within an annular groove having opposed radial surfaces and carried by one of a pair of relatively reciprocally movable members for sealing engagement with a sidewall of the other of the pair of relatively reciprocally movable members and for minimizing fluid leakage between the members. The seal includes a tensionable annular member including a first radial surface for residing adjacent to one of the radial surfaces of the groove, a second radial surface, an inner surface, an outer contact surface engageable with the sidewall, an end gap severing the tensionable annular member and defining spaced-apart first and second ends thereof, a length from the first end to the second end, an annular notch defined by a radial notch surface extending from the inner surface thereof to an inner notch surface extending from the second radial surface thereof, grooves formed across the radial notch surface, the inner notch surface, and the second radial surface from the inner surface of the tensionable annular member to an intermediate position between the inner notch surface and the outer contact surface, and the grooves are spaced-apart along the length of the tensionable annular member between the first end and the second end. Each groove includes a channel section, a hemispherical section, and a waist section therebetween, wherein the channel section extends across the radial notch surface from the inner surface of the tensionable annular member to the waist section proximate to the inner notch surface, and the hemispherical section extends across the second radial surface from the waist section to the intermediate position. The channel section is a rounded bottom. The waist section is narrow relative to the channel section and to the hemispherical section. The grooves are equally sized.

BRIEF DESCRIPTION OF THE DRAWINGS

Specific objects and advantages of the invention will become clear to those skilled in the art from the following detailed description of illustrative embodiments thereof, taken in conjunction with the drawings in which:

FIGS. 5 and 6 are enlarged, fragmentary top plan views of the seal assembly of

FIG. 2;

DETAILED DESCRIPTION

Figure 1:
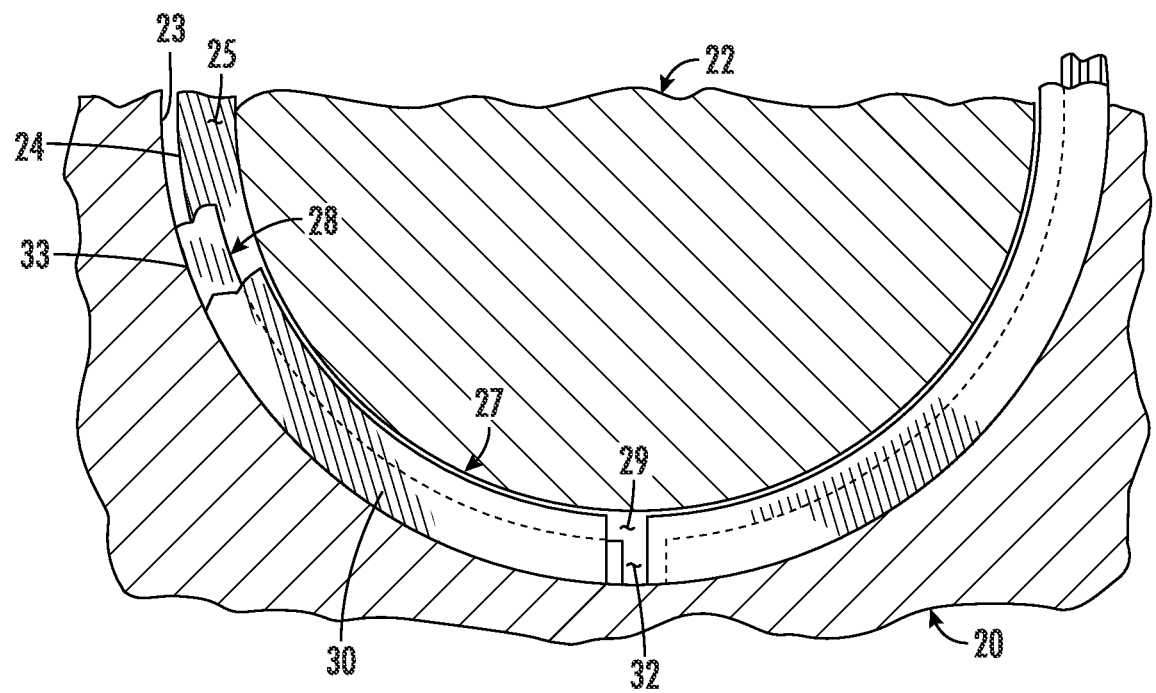
FIG. 1 is a fragmentarily horizontal section view along a ring groove of a typical reciprocating mechanism and showing a commercially successful prior art seal assembly installed therein.

Turning now to the drawings, in which like reference characters indicate corresponding elements throughout the several views, FIG. 1 shows a mechanism including a first member, generally designated at 20, and a second member, generally designated at 22, disposed for relative reciprocal movement along a linear axis perpendicular to the plane of the illustration. The mechanism is typically representative of internal combustion engines, positive displacement pumps, linear fluid actuated motors, and similar apparatus in which first member 20 is the cylinder and second member 22 is the piston. First member 20 includes inner cylindrical sidewall 23 coaxial with and spaced from outer cylindrical sidewall 24 of second member 22. The space between the members, commonly termed sidewall clearance and herein exaggerated for illustrative purposes, ensures relative movement between them. To retard leakage, the second member 22 has an annular groove 25, commonly known in the art as a ring groove, configured to receive and carry a seal assembly. Groove 25 is open to first member 20.

Chosen for illustration purposes is the seal assembly set forth in U.S. Pat. No. 3,811,690 and commercially distributed by TOTAL SEAL, INC. under the trademark TOTAL SEAL®. The TOTAL SEAL® seal assembly includes a tensioned annular member and a gap seal annular member generally designated by the reference characters 27 and 28, respectively. The seal assembly has thickness and radial dimensions to be received within groove 25 according to standard tolerances well-known in the art. Annular member 27 is preferably fabricated of malleable metal such as cast iron. Analogous to the conventional piston ring, annular member 27 is severed by end gap 29 and has a sealing surface 30 which engages cylindrical sidewall 23. Annular member 28 is preferably fabricated of steel, and is dimensioned to be received within a notch (not specifically shown) formed in annular member 27. Annular member 28, like annular member 27, is severed by end gap 32 and has a sealing surface 33 which also engages sidewall 23.

The intricacies and advantages of the above-described seal assembly are well known to the person having ordinary skill in the art. While the assembly is free to move or work within the ring groove, movement between the members is forestalled by the relative forces therebetween. The preceding provides orientation and reference in connection with the ensuing description of instant embodiments of the invention. Aspects not fully described will be clear and appreciated by the person having ordinary skill in the art. Illustrative embodiments of the invention provide improvements to the above-described seal assembly and similar seal assemblies.

Figure 2:
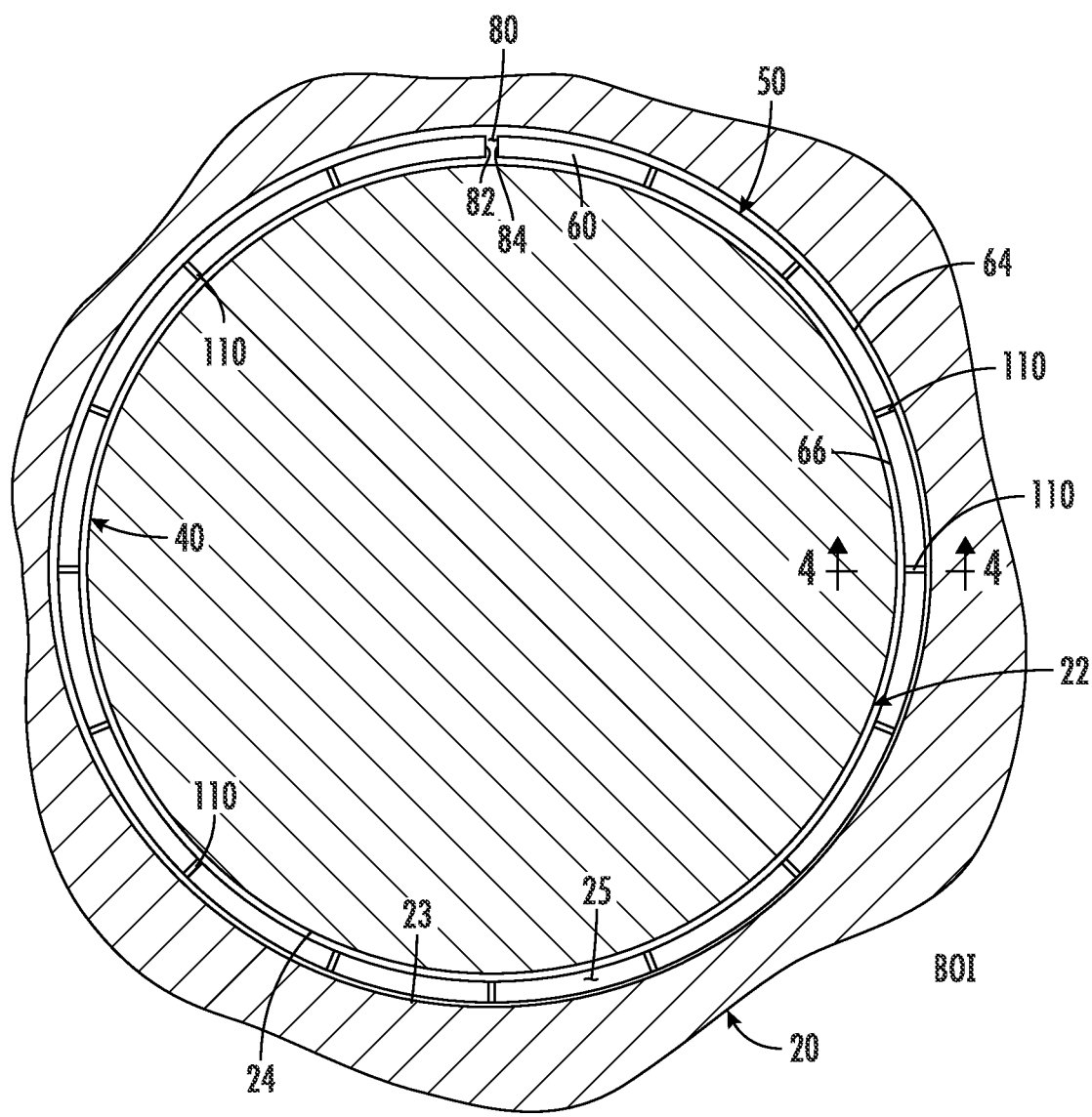
FIG. 2 is a view generally corresponding to FIG. 1 and showing a seal assembly constructed and arranged according to the principle of the invention installed therein.
Figure 3:
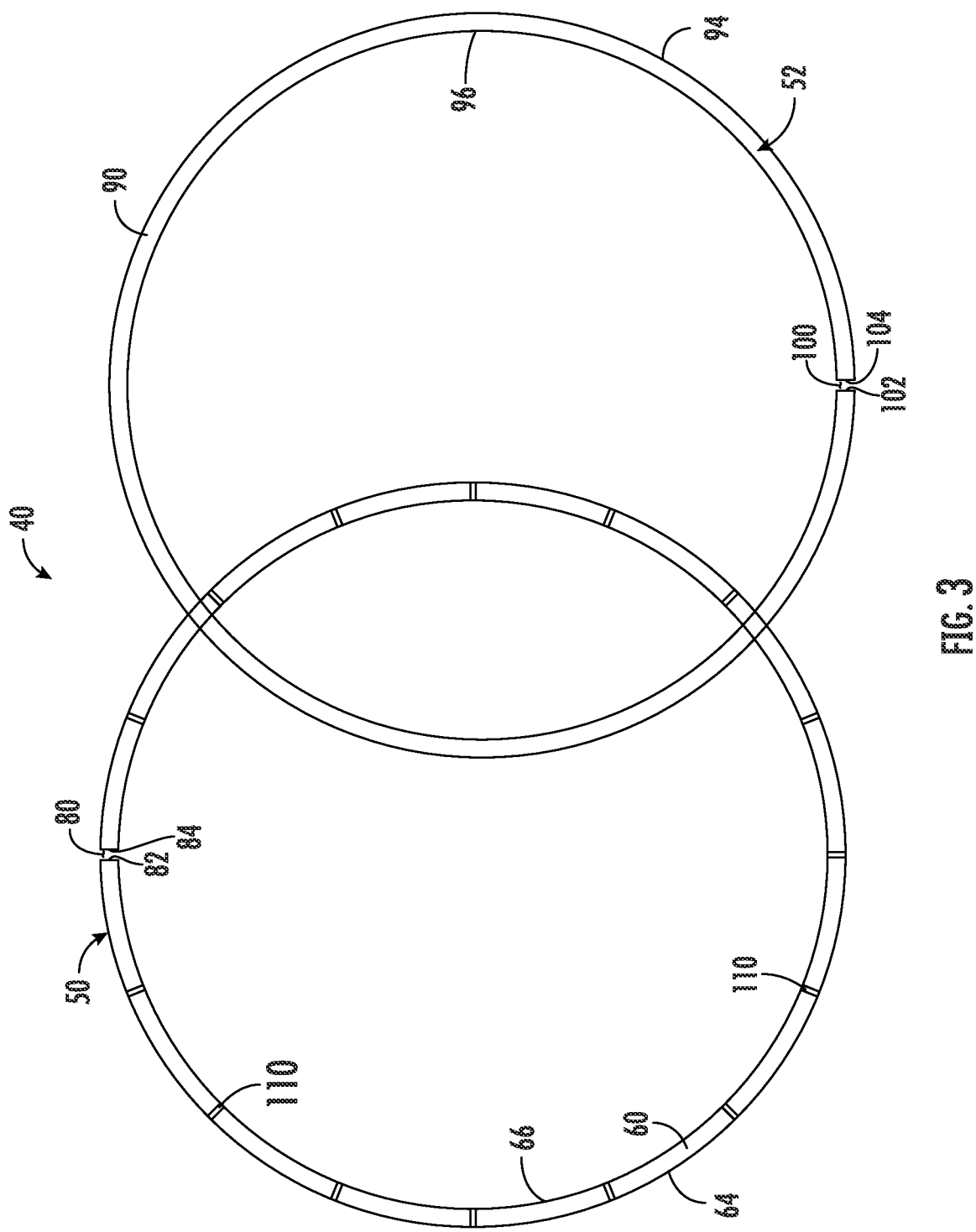
FIG. 3 is a plan view of the seal assembly of FIG. 2.
Figure 4:
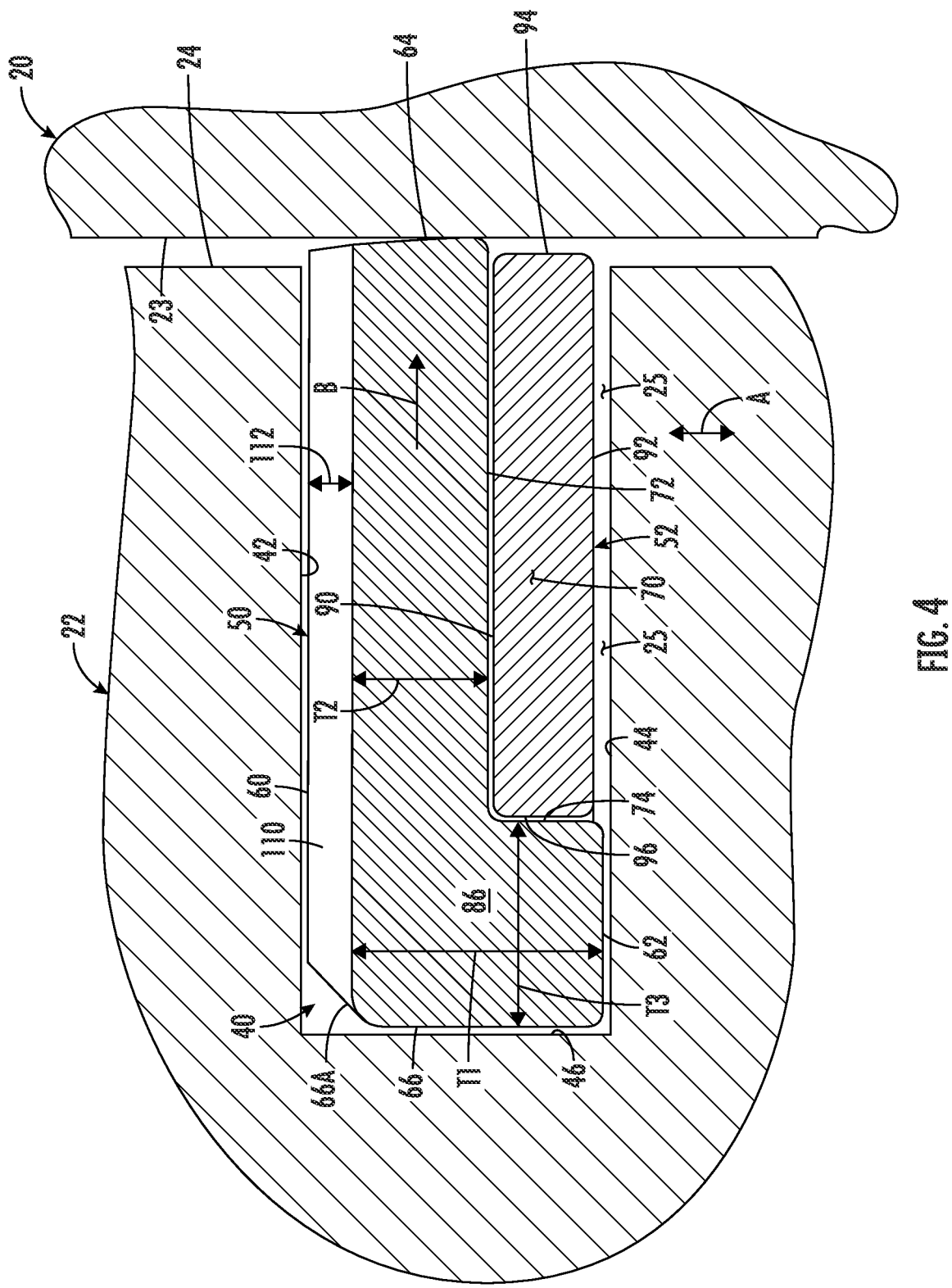
FIG. 4 is a section view taken along line 4-4 of FIG. 2.

Referring to FIG. 2, a seal assembly 40 constructed and arranged according to the principle of the invention is installed in groove 25 of the mechanism of first member 20 and second member 22. Referring to FIG. 3, seal assembly 40 includes a first annular member 50 and a second annular member 52. First annular member 50 is elastically expansive and, thus, has an inherent tendency to expand. Accordingly, first annular member 50 is a tensionable annular member. Second annular member 52 is a gap seal annular member. The dimensions of seal assembly 50 enable its reception within groove 25 as illustrated in FIG. 4 according to standard tolerances well-known in the art and herein exaggerated for purposes of illustration. Groove 25 is generally rectangular in cross-section and includes a first radial surface 42, a second radial surface 44, and an axial inner surface 46. The relative movement between members 20 and 22 occurs in linear directions represented by the double arrow A, which is parallel to inner cylindrical sidewall 23 and outer cylindrical sidewall 24.

First annular member 50, fabricated of a malleable material such as cast iron, nodular iron, or the like, is generally L-shaped in cross-section. First annular member includes a first radial surface 60, a second radial surface 62, an outer contact surface 64, an inner surface 66, and grooves 110 formed in first radial surface 60. Grooves 110 partially relieve the tension of annular member 50 and impart flexibility to annular member 50. Outer contact surface 64 and inner surface 66 are axial surfaces. First radial surface 60 of first annular member 50 resides adjacent to first radial surface 42 of groove 25, and second radial surface 62 of first annular member 50 resides adjacent to second radial surface 44 of groove 25. Outer contact surface 64 is capable of sealing engagement with inner cylindrical sidewall 23 of first member 20, and inner surface 66 resides adjacent to inner surface 46 of groove 25. Annular notch 70 formed into first annular member 50 is generally rectangular in cross-section. A radial notch surface 72 extending inwardly from outer contact surface 64 and an axial inner notch surface 74 extending inwardly from second radial surface 62 to radial notch surface 72 define annular notch 70. An end gap 80 severs first annular member 50 and defines spaced apart ends 82 and 84 in FIG. 3. First annular member 50 has a length from end 82 to end 84. In FIG. 4, first annular member 50 has a first axial thickness T1 between first radial surface 60 and second radial surface 62, a second axial thickness T2 between first radial surface 60 and radial notch surface 72, and a radial thickness T3 from inner surface 66 to inner notch surface 74. First axial thickness T1 is greater than second axial thickness T2. The part of first annular member 50 that extends from inner surface 66 to inner notch surface 74 and from first radial surface 60 to second radial surface 62 is a rail stop of first annular member 50 generally denoted at 86 in FIG. 4.

Second annular member 52, in general analogy to first annular member 50, includes a first radial surface 90, a second radial surface 92, an outer contact surface 94, and an inner surface 96. Outer contact surface 94 and inner surface 96 are axial surfaces. Second annular member 52, fabricated preferably of steel or carbon steel, is dimensioned to be received within notch 70. First radial surface 90 of second annular member 52 resides adjacent radial notch surface 72 of notch 70 of first annular member 50. Second radial surface 92 of second annular member 52 resides adjacent second radial surface 44 of groove 25. Outer contact surface 94 is capable of sealing engagement with inner cylindrical sidewall 23 of first member 20, and inner surface 96 resides adjacent to inner notch surface 74 of annular notch 70. Outer contact surface 94 is chrome-plated in a particular embodiment for wear and friction reduction purposes. According to a preferred embodiment, outer contact surface 94 of second annular member 52 is more resistant to frictional wear than outer contact surface 64 of first annular member 50. In FIG. 3, end gap 100 severs second annular member 52 and defines spaced apart ends 102 and 104. Second annular member 52 has a length from end 102 to end 104.

The material of first annular member 50 is relatively softer than the material of second annular member 52. Outer contact surface 64 can be coated with facings conventional in the art. Outer contact surface 64 of first annular member 50 and outer contact surface 94 of second annular member 52 are preferably rounded in cross-section and coated with a friction-reducing material such as chromium.

Figure 5:
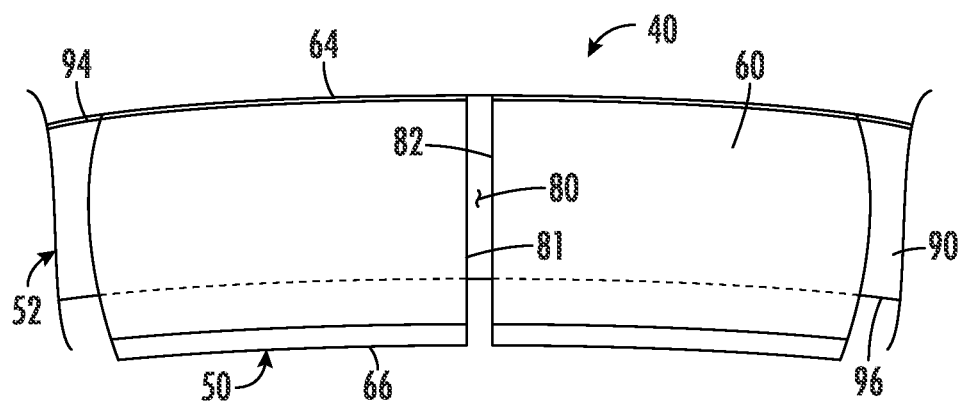
Figure 6:
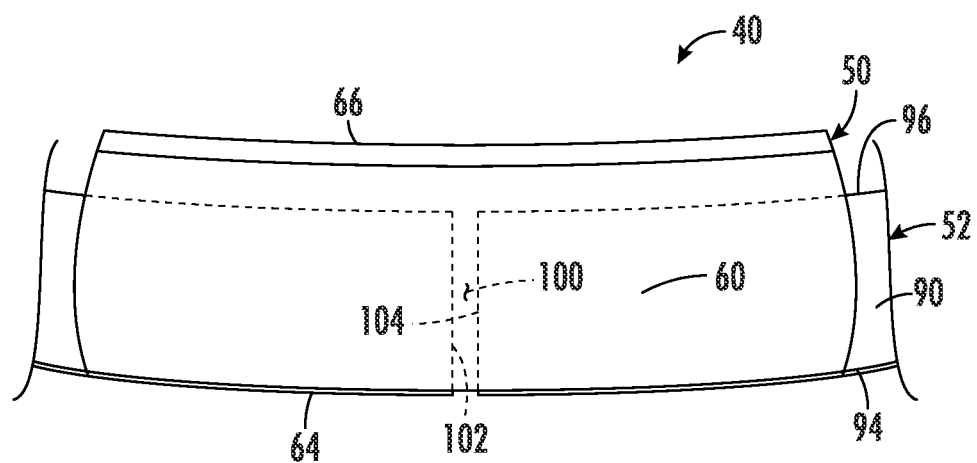

The assembly of first and second annular members 50 form seal assembly 40 shown installed in groove 25 with first annular member 50 and second annular member 52 orientated as seen in FIG. 3. End gap 80 of first annular member 50 is offset to end gap 100 of second annular member 52. In the desired orientation, second annular member 52 seals or closes end gap 80 of first annular member 50 in FIG. 5, and first annular member 50 seals or closes end gap 100 of second annular member 52 in FIG. 6, which forestalls the fluid leakage path inherent in conventional prior art piston rings. As is known in the art, the size of first member 50 enables it to be closely received within groove 25 with sufficient clearance to allow seal assembly 40 to move or work within groove 25. The cross-sectional dimensions of notch 70 are slightly larger than the second annular member 52 to enable reception of second annular member 52 by notch 70.

First annular member 50 tends to expand in the direction of arrow B in FIG. 4 to urge outer contact surface 64 against inner cylindrical surface 23 and against second annular member 52 to urge outer contact surface 94 against inner cylindrical sidewall 23 upon an initial wearing of outer contact surface 64. This is a known phenomenon in such seal assemblies. As is known in the art, the forces act to prohibit relative movement between first annular member 50 and second annular member 52 of seal assembly 50. The elastic expansiveness or outwardly directed radial force of first annular member 50 in the direction of arrow B in FIG. 4 seals outer contact surface 64 of first annular member 50 against inner cylindrical sidewall 23 and contact surface 94 of second annular member 52 against cylindrical outer surface 23 after the initial wearing of outer contact surface 64 against inner cylindrical sidewall 23 brings second annular member 52 under the influence of the tension of first annular member 50. The fabrication of annular seals having prescribed elastic expansiveness is known by those skilled in the art. The unit tension or unit pressure, which is the amount of pressure exerted by the outer contact surfaces 64 and 94 of the respective annular members 50 and 52 against inner cylindrical wall 23 by the elastic expansiveness of first annular member 50 seals the outer contact surfaces 64 and 94 against inner cylindrical wall 23. While first annular member 50 exerts an outward force, the outwardly directed force of second annular member 52 is negligible. Second annular member 52 is neutral relative to first annular member 50 and is relatively relaxed when installed. Accordingly, second annular member 52 is outwardly "tensioned" in the direction of arrow B in FIG. 4 by first annular member 50 to seal outer contact surface 94 seals against inner cylindrical surface 23 upon the initial wearing of outer contact surface 64, which constitutes the seating of seal assembly 40.

Seating of seal assembly 40, the mating of the outer contact surfaces 64 and 94 with the inner cylindrical sidewall 23, is important. Seal assembly 40 appears as illustrated in FIG. 4 when initially installed. Outer contact surface 64 of first annular member 50 is in contact with inner cylindrical sidewall 23 of member 20. Due to the inherent characteristics of first annular member 50, its relatively soft material and its tendency to expand, outer contact surface 64 rapidly wears away against inner cylindrical sidewall 23 during initial operation or "wear-in" to quickly bring outer contact surface 94 of second annular member 52 into sealing contact against inner cylindrical sidewall 23. Accordingly, rapid wear-in or seating of seal assembly 40 occurs. Seating persists until sufficient material removed from outer contact surface 64 causes inner notch surface 74 to directly abut inner surface 96 of second annular member 52 to enable the outwardly-directed force of first annular member 50 to push second annular member 52 outwardly. While outer contact surface 64 remains in contact with inner cylindrical sidewall 23, outer contact surface 94 of second annular member 52 bears the force against inner cylindrical sidewall 23. Accordingly, outer contact surface 94 of second annular member 52 is brought into and held in sealing contact against inner cylindrical sidewall 23 under the influence of or otherwise at the urging of first annular member 50 acting on second annular member 52.

The diameter of inner cylindrical sidewall 23 enlarges and the seal assembly 40 decreases in diameter over the apparatus's operating life from initial operation to normal time for rebuild. However, no loss in the effectiveness of the seal assembly 40 or leakage between the members 20 and 22 will occur. As the material of seal assembly 40 wears away, first annular member 50 continues to expand to maintain the desired seal. End gap 80 increases at the same time first annular member 50 expands. Second annular member 42, however, will continue to function as an end gap seal member. While first annular member 50 expands, grooves 110 formed across first radial surface 60 from outer contact surface 64 to inner surface 66 impart flexibility into first annular member 50 and partially relieve the unit tension or unit pressure of first annular member 50. In other words, grooves 110 partially relieve the inherent tendency of first annular member 50 to expand. At the same time, first annular member 50 retains sufficient tension to push directly against second annular member 52 to urge outer contact surface 94 into sealing engagement against inner cylindrical sidewall 23 while preventing outer contact surface 94 from wearing prematurely.

In FIGS. 2 and 3, grooves 110 are cut entirely across first radial surface 60 from outer contact surface 64 to inner surface 66. In FIG. 4, an upper part or extension of inner surface 66 is chamfered at 66A at a forty-five-degree angle to first radial surface 60 for ease of manufacture and reducing the overall weight of first annular member 50. Each groove 110 is cut entirely across first radial surface 60 from outer contact surface 64 to chamfered surface 66A.

Figure 7:
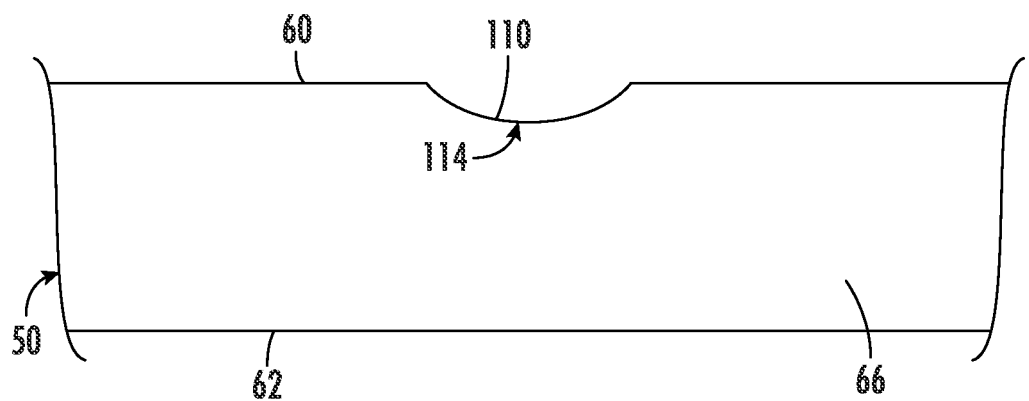
FIG. 7 is an enlarged, fragmentary inner end elevation view of the seal assembly of FIG. 2.

Grooves 110 are spaced-apart along the length of first annular member 50 between end 82 and end 84. Grooves 110 are equally spaced apart in this example and extend transversely to first annular member 50 on an axial line of first annular member 50, although they can extend diagonally at an angle to the axial line of first annular member 50 in an alternate embodiment. Grooves 110 are identical in both size and shape. Each groove 110 is an entirely rounded bottom extending inwardly from first radial surface 60 as shown in FIG. 7, which forestalls cracks from propagating in first annular member 50 from each groove 110 when tensioned. In FIG. 4, each groove 110 extends axially into first axial thickness T1 from first radial surface 60 thirteen to fifteen percent of first axial thickness T1 and into second axial thickness T2 from first radial surface 60 twenty-one to twenty-three percent of second axial thickness T2. Each groove 110 has an axial groove depth 112 from first radial surface 60 to the lowermost point of rounded bottom 110, and a groove radius 114 in FIG. 7 extending from either side of first radial surface 60. There is a preferred ratio of from 1:8 to 1:10 of the axial groove depth 112 to the groove radius 114. All the preceding groove 110 properties are chosen not as a matter of mere design choice but rather to ensure several important benefits. The groove 100 properties ensure that each groove 110 imparts flexibility and tension-relieving properties to first annular member 50. The groove 110 properties also prevent first annular member 50 from breaking when tensioned throughout its operational life, from being too flexible, from being too flexible in the region of each groove 110, and from losing its ability to seat and seal as described herein. In short, the groove 110 properties ensure that grooves 110 work in coordination with one another to impart the desired flexibility in first annular member 50 and to ensure the tension of first annular member 50 is sufficiently relieved or relaxed, including in the region of each groove 110, according to this disclosure.

Each groove 110 is a relief, or tension-relieving groove, cut or machined into first radial surface 60 of first annular member 50, such as with a cutting wire. Each groove 110 partially relieves the inherent tendency of first annular member 50 to expand, the unit tension or pressure exerted by first annular member 50, in the direction of arrow B in FIG. 4 when installed with members 20 and 22. The sum of grooves 110 cooperate to partially relieve the inherent tendency of first annular member 50 to expand along the length of first annular member 50 from end 82 to end 84 on either side of end gap 80 to partially relieve or relax the tension of first annular member 50 in the direction of arrow B in FIG. 4 when seal assembly 40 is installed for partially relieving the pressure of outer contact surfaces 64 and 94 against inner cylindrical sidewall 23 upon and following the seating of seal assembly 40. The unit tension or unit pressure, the amount of pressure exerted by outer contact surfaces 64 and 94 against inner cylindrical sidewall 23 by first annular member 50, is reduced by grooves 110. The unit tension or unit pressure reduction is from ten to fifteen percent of the unit tension or pressure of a companion piston ring seal assembly having no such grooves. Since the outwardly directed force of second annular member 52 is negligible, it is groove-less and assumes the flexibility of tension-relieving properties of first annular member 50 without having to be formed with grooves.

Since grooves 110 are equally spaced-apart circumferentially along the length of first annular member 50 between end 82 and 84 as shown in FIGS. 2 and 3, they impart constant flexibility and tension-relieving properties to first annular member 50 from end 82 to end 84. In this example, first annular member 50 has fifteen equally spaced-apart grooves 110. The spacing and number of grooves 110 imparts flexibility to first annular member 50 and partially relieves the inherent tendency of first annular member 50 to expand along the length of first annular member 50 from end 82 to end 84 in the direction of arrow B in FIG. 2 when seal assembly 40 is installed with members 20 and 22. The tension-relieving property grooves 110 impart to first annular member 50 partially relieves the pressure of outer contact surfaces 64 and 94 against inner cylindrical outer surface 23. At the same time, first annular member 50 retains a sufficient tendency to expand when tensioned to seat and seal the seal assembly 40 against inner cylindrical sidewall 23, to urge outer contact surfaces 64 and 94 in sealing engagement against inner cylindrical sidewall 23 of first member 20. The tension-relieving property grooves 110 impart lessens the pressure or force between the outer contact surfaces 64 and 94 of the respective annular members and inner cylindrical sidewall 23 favorably influencing wear of outer contact surfaces 64 and 94. The reduced pressure of outer contact surfaces 64 and 94 against inner cylindrical sidewall 23 reduce wear of the outer contact surfaces 64 and 94 favorably influencing the operating life of seal assembly 40, and reduce friction between outer contact surfaces 64 and 94 and inner cylindrical sidewall 23. This favorably influences the ability of first and second members 20 and 21 to reciprocate relative to one another favorably influencing increased power and improved gas mileage in internal combustion engines.

The flexibility grooves 110 impart to first annular member 50 and to second annular member 52 by the influence of first annular member 50 produce an inherent conforming/conformability property in first annular member 50 and second annular member 52 by or otherwise under the influence of first annular member 50. The conforming property enables first annular member 50 and second annular member 52 under the influence of first annular member 50 to flexibly conform outer contact surfaces 64 and 94 to inner cylindrical sidewall 23 of first member 20 even when the bore or cylinder, first member 20, is not perfectly round, which eliminates the need for a prolonged break-in. The inherent conforming characteristic that grooves 110 impart to first annular member 50 enable it to seat and seal outer contact surface 64 with little or no break-in and little or no physical wearing of outer contact surface 64 into inner cylindrical sidewall 23 to produce a compatible seal, until outer contact surface 64 conforms to inner cylindrical sidewall 23. When outer contact surface 94 sealingly engages inner cylindrical sidewall 23, first annular member 50 imparts its inherent conforming property to second annular member 52. Accordingly, seating and sealing of second annular member 52 requires little or no break-in and little or no physical wearing of outer contact surface 94 into inner cylindrical sidewall 23 to produce a compatible seal, until outer contact surface 94 of second annular member 52 conforms to inner cylindrical sidewall 23. The described conforming characteristic grooves 110 impart to first annular member 50 and to second annular member 52 by first annular member 50 seats and seals first and second annular members 50 and 52 to inner cylindrical wall 23 shortly after installation of seal assembly 40 with first member 20 and second member 22 and produces a persistently conforming seal of outer contact surfaces 64 and 94 against inner cylindrical sidewall 23 thereafter, which favorably influences engine power output, oil consumption, and emissions production. The described seating and sealing of first and second annular members 50 and 52 prevent combustion gases from escaping the combustion chamber past first and second annular members 50 and 52 into engine's crankcase. This lack of "blow-by" keeps the engine running cleaner and cooler and reduces the engine emissions by preventing hot combustion gases and by-products from entering the crankcase section of the engine.

Along with sealing combustion gases in the combustion chamber, first and second annular members 50 and 52 manage the amount of oil present on inner cylindrical sidewall 23 for lubrication. The seating and sealing of first and second annular members 50 and 52 as described above allows them to perform this function and will prevent excessive amounts of oil to accumulate on inner cylindrical sidewall 23 for, in turn, preventing the burning of oil each time the cylinder fires favorably influencing the engine's emissions. The conforming property grooves 110 impart to first annular member 50 and to second annular member 52 by first annular member 50 tensioned against second annular member 52 enable outer contact surfaces 64 and 94 of seal assembly 40 to constantly conform to the inner cylindrical sidewall 23 during engine operation under variable heat and pressures to constantly maintain the seal of outer contact surfaces 64 and 94 against inner cylindrical sidewall 23. Since grooves 110 open the back of grooves 25 to inner cylindrical sidewall 23, any gas and/or oil that accumulate at the back of the grooves 25 resulting from expansion of fuel and oil components in the cylinder.

The tension-relieving and flexibly-conforming properties the sum of grooves 110 impart to first annular member 50 is a function not only of the relative dimension of grooves 110 but also the number of grooves 110 and the spacing between each groove 110 and an adjacent groove 110. The tension-relieving and conforming properties grooves 110 impart to seal assembly 40 increase as the number of grooves 110 increase and the distance between the grooves 110 decreases. The properties decrease as the number of grooves 110 decrease and the distance between the grooves 110 increases. In first annular member 50, the number of grooves 110 and the distance or spacing between each groove 110 and an adjacent groove 110 are chosen to produce preselected tension-relieving and conforming properties, a net unit tension or pressure, in first annular member 50, in this example approximately fifteen percent of the unit tension or pressure of a companion piston ring having no such grooves 110. Any number of grooves 110 can be used and any selected spacing can be used between adjacent grooves 110, including equal spacings, or variable spacings, including a preselected combination of equal and variable spacings, to set first annular member 50 and second annular member 52 under the influence of first annular member 50 to a desired unit tension/pressure and flexibility. In short, the number of grooves 110 and spacing between adjacent grooves 110 can be selectively chosen to produce a preselected tension-relieving property and flexibility in first annular member 50 to set first annular member 50 and second annular member 52 under the influence of first annular member 50 to a preselected unit tension or pressure when seated, according to the principle of the invention.

Figure 8:
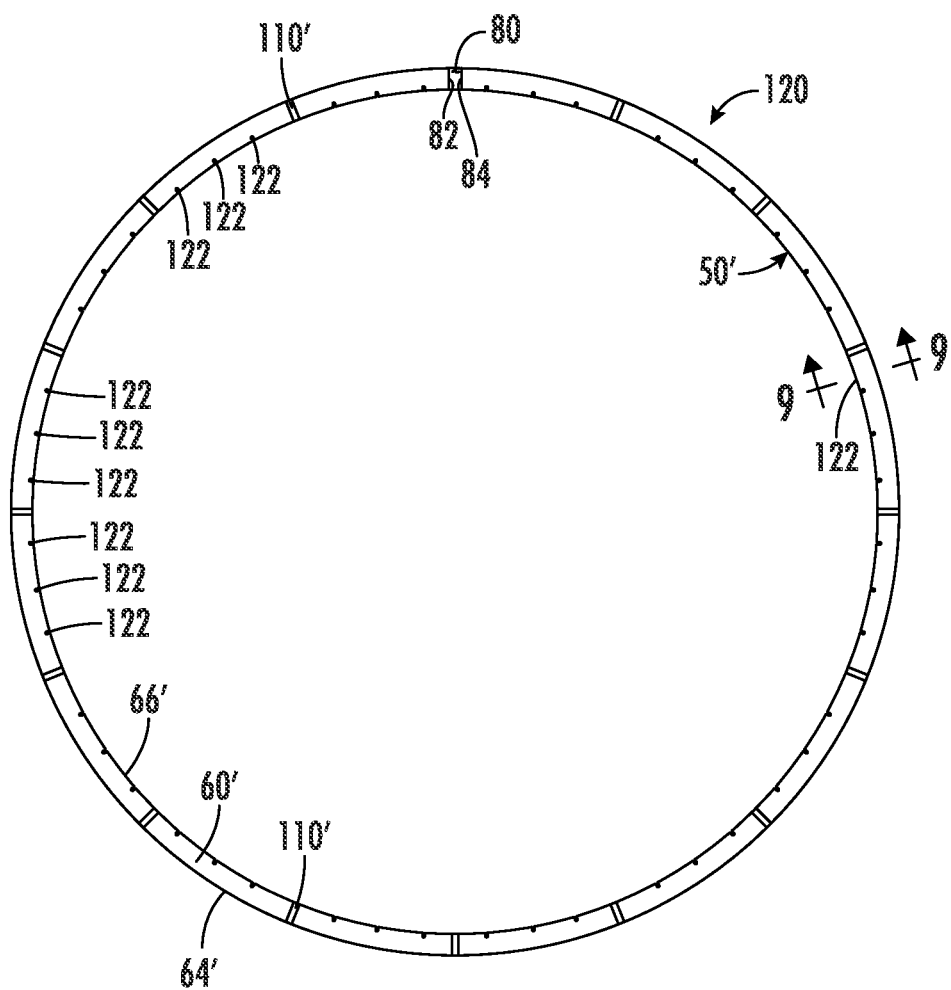
FIG. 8 is a top plan view of an alternate embodiment of a seal assembly constructed and arranged according to the principle of the invention.
Figure 9:
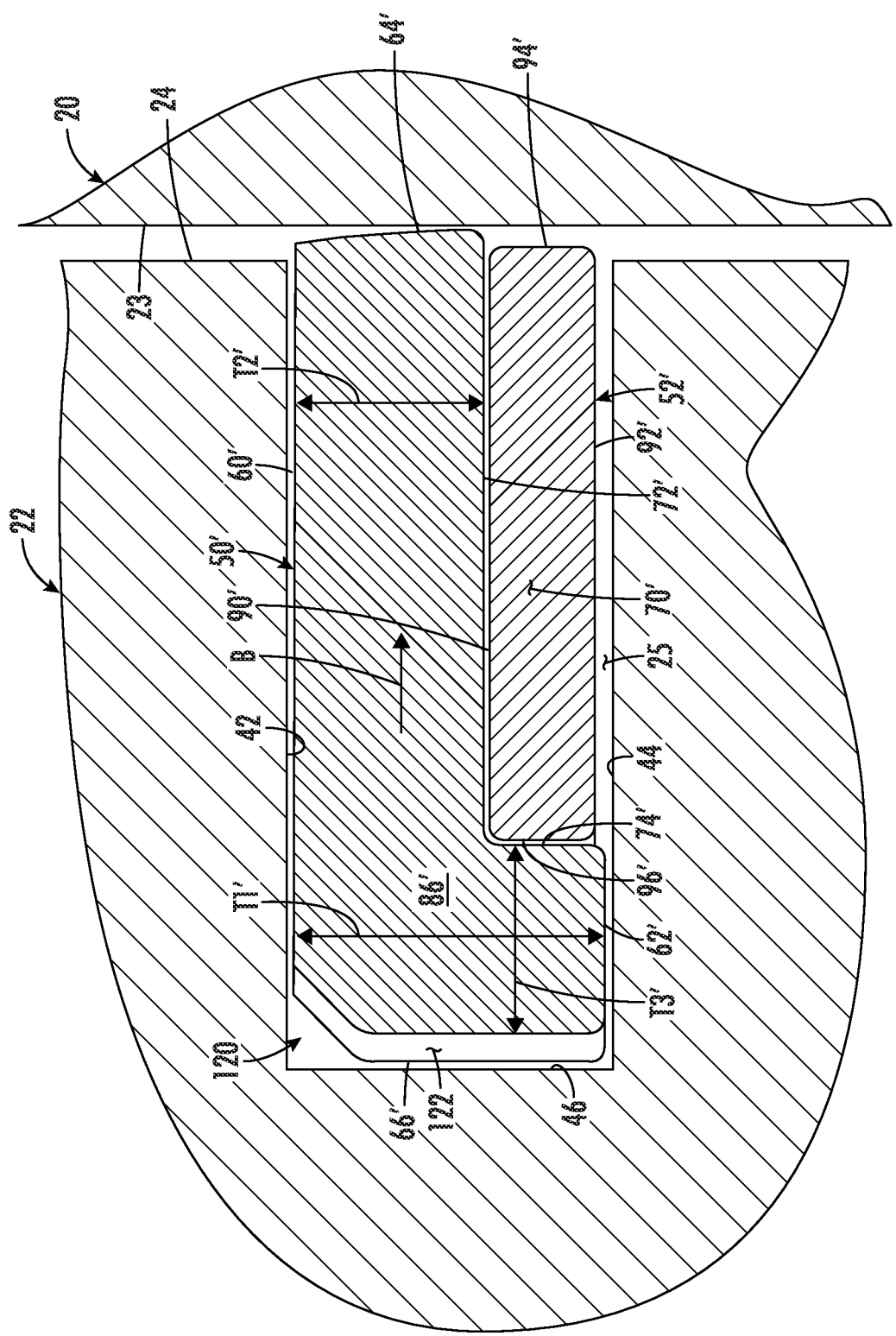
FIG. 9 is a view generally corresponding to FIG. 4 and showing the seal assembly of FIG. 8 installed therein.

FIGS. 8 and 9 illustrate an alternate embodiment of a seal assembly generally denoted at 120. In common with seal assembly 40, seal assembly 120 shares first annular member 50 and second annular member 52. Referring to FIG. 8, seal assembly 120 installed in groove 25 of second member 20 interacts with first member according to the discussion of seal assembly 40. Accordingly, except for the differences between seal assembly 120 and seal assembly 40 discussed below, the preceding discussion of seal assembly 40 applies to seal assembly 120 in every respect. Components of seal assembly 120 common to those of seal assembly 40 have the same number with a prime (') added to represent the different embodiment.

Notches 122 formed in inner surface 66' of first annular member 50' impart the flexibly-conforming and tension-relieving properties to first annular member 50' like grooves 110' and for the same purposes as grooves 110 discussed above. Accordingly, notches 122 work in coordination with grooves 110' to "fine-tune" first annular member 50' flexibly-conforming and tension-relieving properties beyond what grooves 110' provide as may be desired by the skilled artisan.

Notches 122 are spaced-apart along the length of annular member 50 between first end 82 and second end 84 in FIG. 8. Notches 122 are equally spaced apart in this example. Notches 122 are identical in size and in shape, and extend radially inward into radial thickness T3' of rail stop 86 from inner surface 66 and axially through axial thickness T1' across inner surface 66 of rail stop 86 from first radial surface 60 to second radial surface 62 in FIG. 9. Notches 122 are radially perpendicular and axially parallel to the axis about which first annular member 50 is arranged. Notches 122 are cut or machined into inner surface 66, such as with a cutting wire.

Each notch 122 is a relief, or tension-relieving notch, cut or machined into inner surface 66' of first annular member 50', such as with a cutting wire. Each notch 122 partially relieves the inherent tendency of first annular member 50' to expand, the unit tension or pressure exerted by first annular member 50', in the direction of arrow B in FIG. 9 when installed with members 20 and 22. The sum of notches 122 work in coordination with the sum of grooves 110' to impart the flexibility and tension-relieving properties to first annular member 50' and to second annular member 52' by first annular member 50' as described with seal assembly 40 but to a greater extent in comparison. The increased reduction in unit tension or pressure in this example is from twenty to twenty-five percent of that of a companion piston ring seal assembly having no such grooves and notches. Since the outwardly directed force of second annular member 52' is negligible, it is notch-less.

Figure 10:
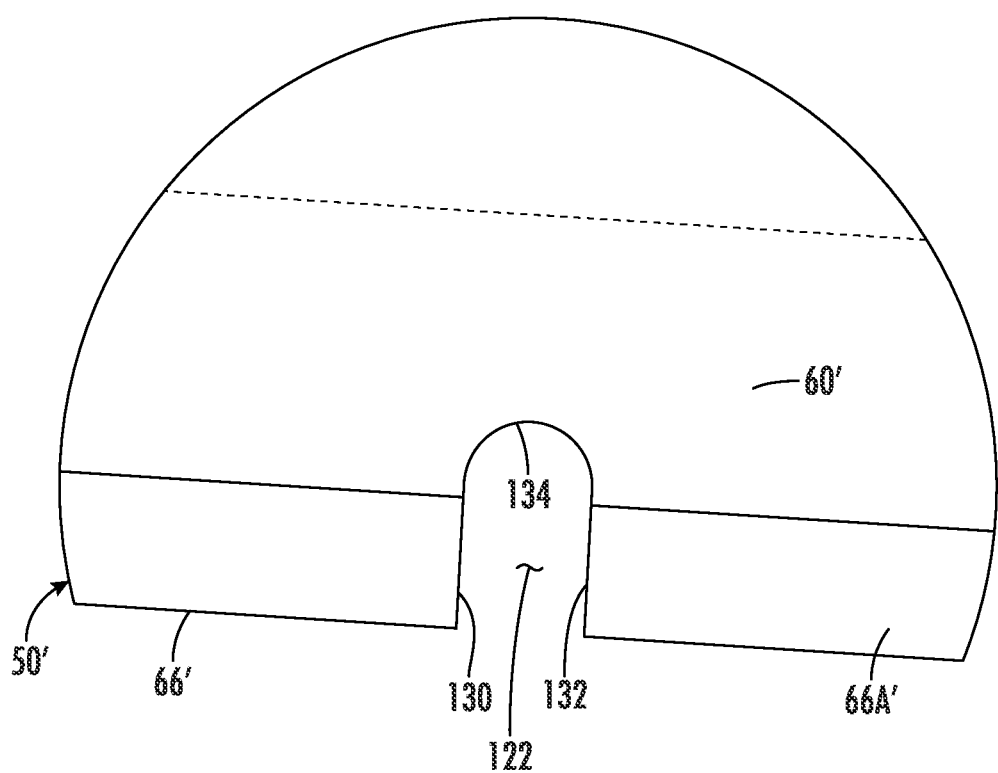
FIG. 10 is an enlarged, fragmentary top plan view of the seal assembly of FIG. 8.

In FIG. 10, each notch 122 is U-shaped and is defined by opposed side surfaces 130 and 132 that extend radially inward into first annular member 50' from inner surface 66' to an inwardly-curved notch tip 134. Notch tip 134 is blunt, being rounded along its extent from side surface 130 to side surface 132 and not sharp or pointed from side surface 130 to side surface 132, having no sharp edges or points along its extent from side surface 130 to side surface 132. The blunt form of notch tip 134 forestalls cracks from forming in first annular member 50 from notch tip 134 from side surface 130 to side surface 132 when first annular member 50' is tensioned. In other words, notch tip 134 is an inner radius or radial surface that is inherently blunt, being rounded and not sharp or pointed, having no sharp edges or points. Side surfaces 130 and 132 are parallel relative to each other in this example, and notch tip 134 is a radius surface. Each notch 122 extends radially into radial thickness T3' from inner surface 66' no more than fifty percent of radial thickness T3'. This configuration prevents first annular member 50' from being too flexible and from being too flexible in the region of each notch 122, and losing its ability to seat and seal. At the same time, the configuration of notches 122 ensures that the tension of first annular member 50' is sufficiently relieved or relaxed and that first annular member 50' exhibits the flexibly-conforming property all in coordination with grooves 110', including in the region of each notch 122.

Since notches 122 are equally spaced-apart circumferentially along the length of first annular member 50' between end 82' and 84' as shown in FIG. 8, they impart constant conforming and tension-relieving properties to first annular member 50' from end 82' to end 84'. In this example, first annular member 50' has forty-eight notches 122. Three notches 122 are present between adjacent grooves 110', and three notches are present on either side of end gap 80' and the respective adjacent grooves 110'. Those having regard for the art will appreciate that any desired number can be used between adjacent grooves 110' and on either side of end gap 80 as discussed below. A groove 110' is between each pair of adjacent notches 122. No notch 122 is in-line with, formed with, or intersects any groove 110' for the liability of breakage, imparting too much flexibility, and under-tensioning annular member 50' in the region of each groove 110' according to the invention. The described arrangement and number of grooves 110' and notches 122 imparts the conforming and tension-relieving properties to first annular member 50' and to second annular member 52' by first annular member 50' beyond that of seal assembly 40 when seal assembly 120 is installed with members 20 and 22. The pressure of outer contact surfaces 64' and 94' of seal assembly 120 against inner cylindrical outer surface 23 is, therefore, not as great as seal assembly 40. However, first annular member 50' retains a sufficient tendency to expand when tensioned to seat and seal assembly 120, to urge outer contact surfaces 64' and 94' into engagement against inner cylindrical sidewall 23 with sufficient pressure to produce a sealing engagement therebetween. The pressure or force between the outer contact surfaces 64' and 94' and inner cylindrical sidewall 23 is less than seal assembly 40. Accordingly, the configuration of seal assembly 120 favorably influences wear of contact surfaces 64' and 94', seal assembly 120 operating life, reduced friction between outer contact surfaces 64' and 94' and inner cylindrical sidewall 23, and the relative reciprocation of first and second members 20 and 21. The spacing between adjacent notches 122 and the number of notches 122 are chosen to impart desired conforming and tension-relieving properties to first annular member 50' and to second annular member 52' under the influence of first annular member 50'.

The tension-relieving and conforming properties the sum of notches 122 imparts to first annular member 50' and to second annular member 52' under the influence of first annular member 50 is a function not only of the relative dimension of notches 122 but also the number of notches 122, and the spacing between each notch 122 and an adjacent notch 122. The properties notches 122 impart increases as the number of notches 122 increases and the distance between the notches 122 decreases, and decreases as the number of notches 122 decreases and the distance between the notches 122 increases. In first annular member 50', the number of notches 122 and the distance or spacing between each notch 122 and an adjacent notch 122 are chosen to produce preselected conforming and tension-relieving properties, a net unit tension or pressure, in first annular member 50' in coordination with grooves 110', in this example approximately twenty-five percent of the unit tension or pressure of a companion piston ring having no such grooves 110' and notches 122. Any desired number of grooves 110' and notches 122 and relative spacings therebetween can be used, including equal spacings, or variable spacings, including a preselected combination of equal and variable spacings, to set first annular member 50' and second annular member 52' under the influence of first annular member 50' to a preselected flexibility and unit tension or pressure by the coordination of grooves 110' and notches 122. The number of grooves 110' and notches 122 and the spacing between adjacent grooves 110' and notches 122 and between each notch 122 and an adjacent groove 110' is chosen to impart desired conforming and tension-relieving properties in first annular member 50' and second annular member 52' under the influence of first annular member 50'.

The properties each notch 122 imparts to first annular member 50' is comparatively less than each groove 110'. Accordingly, a selected number of notches 122 can be incorporated in first annular member 50' in conjunction with a chosen number of grooves 110' at desired spacings to "fine-tune" first annular member 50' and second annular member 52' under the influence of first annular member 50' to a chosen flexibility and tension to serve the conforming and wear-reduction purposes.

Figure 11:
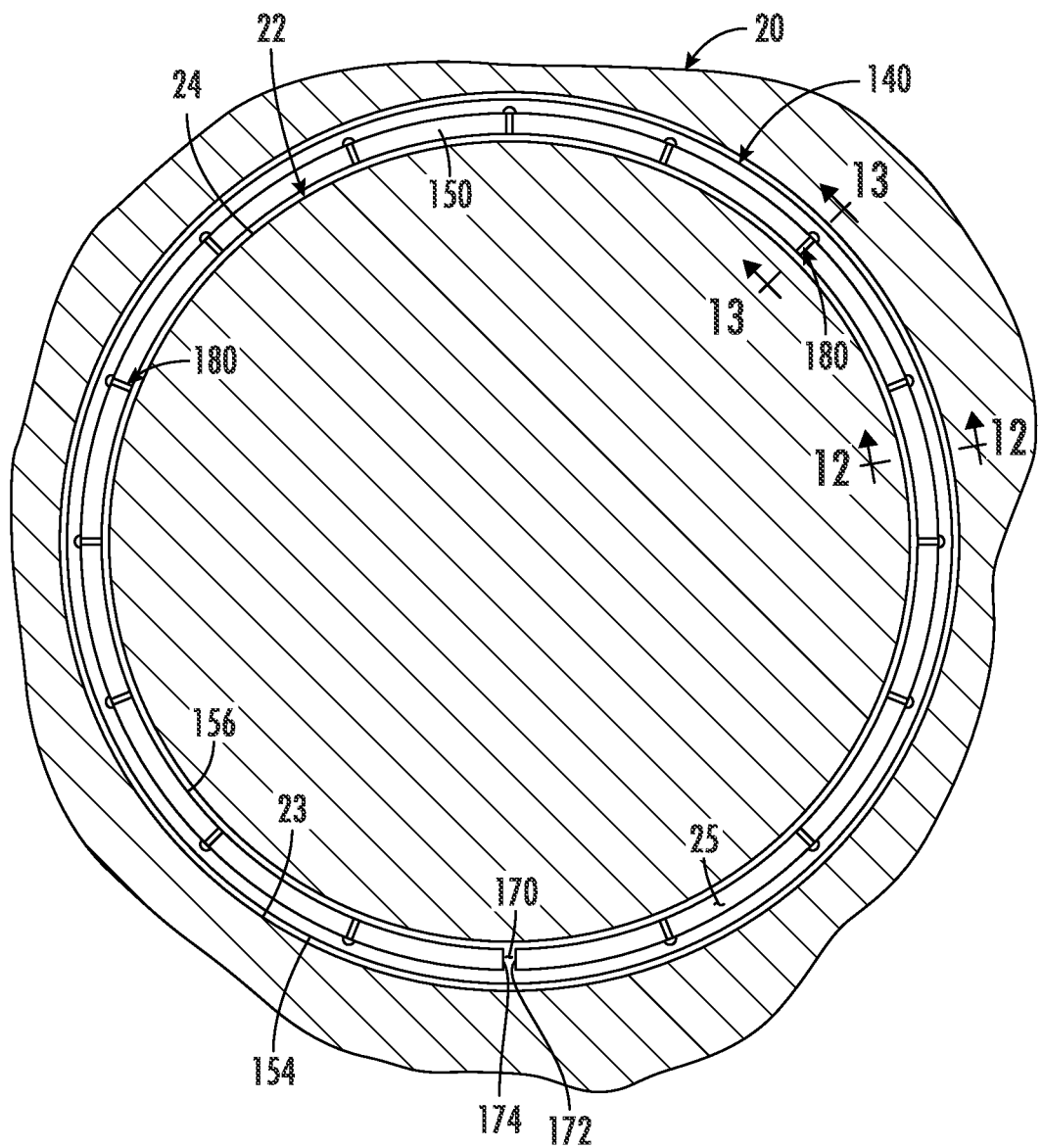
FIG. 11 is a view generally corresponding to FIG. 2 and showing a seal constructed and arranged according to the principle of the invention installed therein.

Turning now to FIG. 11, illustrated is a seal 140 constructed and arranged according to the principle of the invention installed in groove 25 of the mechanism of first member 20 and second member 22. The dimensions of annular member 140 enable its reception within groove 25 as illustrated in FIGS. 12 and 13 according to standard tolerances well-known in the art and herein exaggerated for illustration purposes.

Seal 140 is an annular member, is elastically expansive and, thus, has a tendency to expand. Accordingly, annular member 140 is a tensionable annular member and is preferably fabricated of a malleable material such as cast iron, ductile iron, steel, or other material or combination of materials useful for hydraulic or compression sealing. Annular member 140 is generally L-shaped in cross-section, and includes, with reference to FIGS. 12 and 13, a first radial surface 150, a second radial surface 152, an outer contact surface 154, an inner surface 156, and grooves 180. Outer contact surface 154 and inner surface 156 are axial surfaces. Grooves 180 impart the conforming and tension-relieving properties to annular member 140 consistent with the descriptions of seal assemblies 40 and 120.

Figure 12:
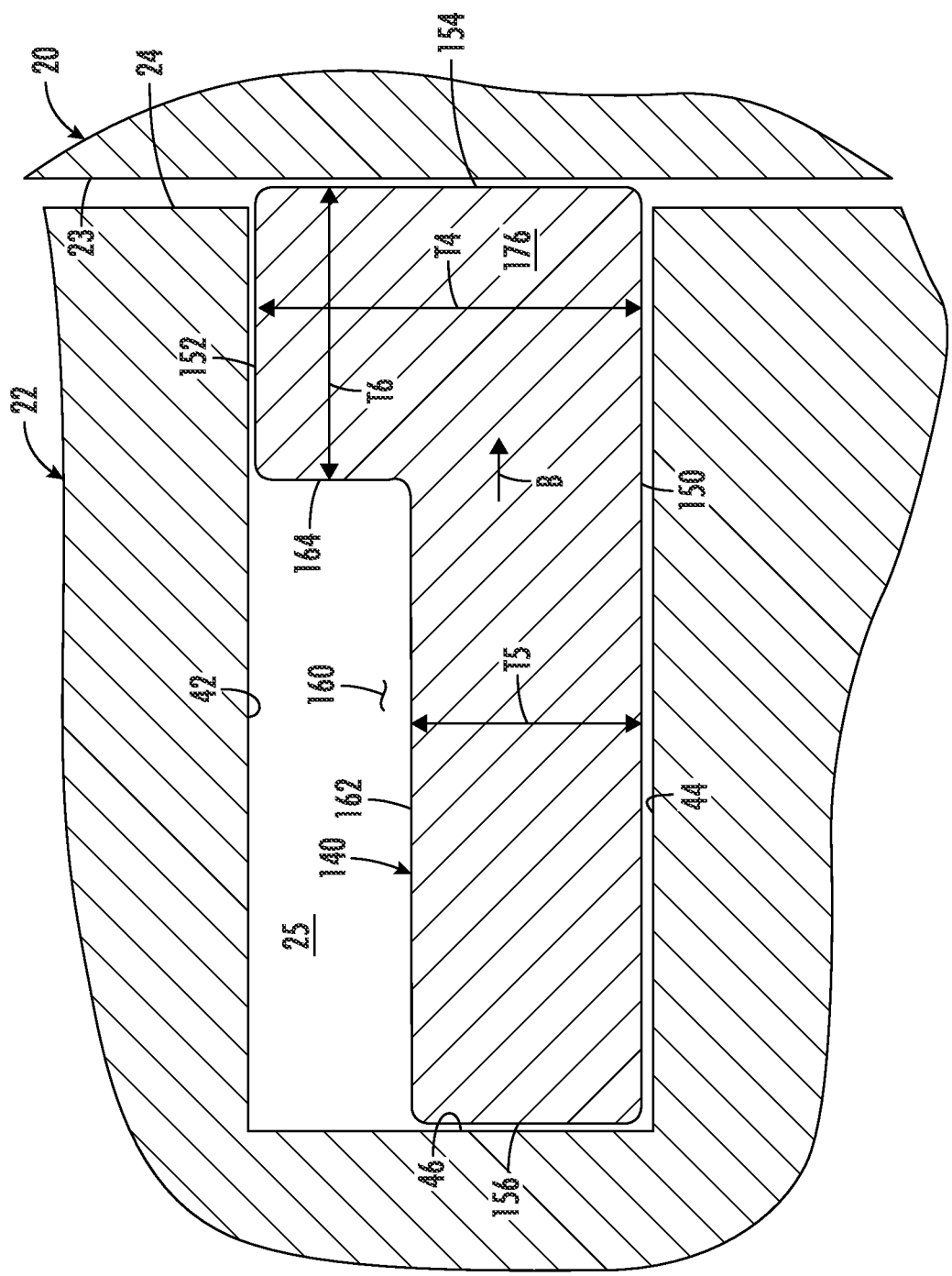
FIG. 12 is a section view taken along line 12-12 of FIG. 11.
Figure 13:
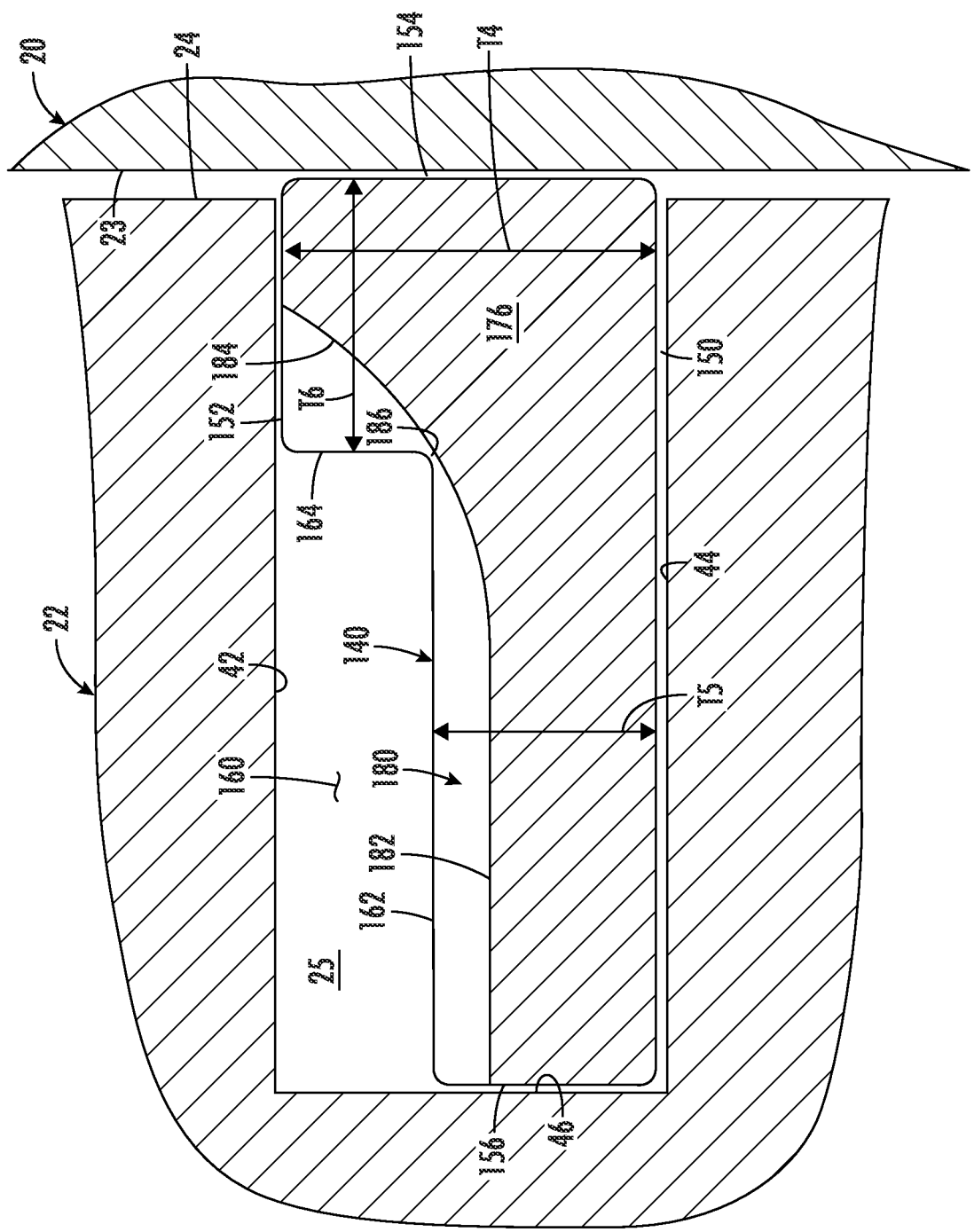
FIG. 13 is a section view taken along line 13-13 of FIG. 11.

Annular member 140 is sized to be closely received within groove 25 as illustrated in FIGS. 12 and 13. First radial surface 150 of annular member 140 resides adjacent to second radial surface 44 of groove 25, and second radial surface 152 of annular member 140 resides adjacent to first radial surface 42 of groove 25. Outer contact surface 154 is capable of sealing engagement with inner cylindrical sidewall 23 of first member 20, and inner surface 156 resides adjacent to inner surface 46 of groove 25. Annular notch 160 formed into annular member 140 is generally rectangular in cross-section. A radial notch surface 162 extending outwardly from inner surface 156 and an axial inner notch surface 164 extending inwardly from second radial surface 152 to radial notch surface 162 define annular notch 160. An end gap 170 severs annular member 140 and defines spaced apart ends 172 and 174 in FIG. 11. Annular member 140 has a length from end 172 to end 174. In FIGS. 12 and 13, annular member 140 has a first axial thickness T4 between first radial surface 150 and second radial surface 152, a second axial thickness T5 between first radial surface 150 and radial notch surface 162, and a radial thickness T6 from outer contact surface 154 to inner notch surface 164. First axial thickness T4 is greater than second axial thickness T5. The part of annular member 140 that extends from outer contact surface 154 to inner notch surface 164 and from first radial surface 150 to second radial surface 152 is a rail stop of annular member 140 generally denoted at 176 in FIG. 4. As installed, annular member 140 is tensioned to exert an outward force against inner cylindrical sidewall 23 in the direction of arrow B to bring outer contact surface 154 of annular member 140 in sealing engagement against inner cylindrical sidewall 23 of first member 20.

Annular member 140 is tensioned when installed due to its tendency to expand to urge outer contact surface 154 in sealing engagement against inner cylindrical sidewall 23 of first member 20. The elastic expansiveness or outwardly directed radial force of annular member 140 indicated by arrow B in FIGS. 12 and 13 seals outer contact surface 154 against inner cylindrical sidewall 23 of first member 20. The fabrication of annular seals having prescribed elastic expansiveness is known to those skilled in the art. The unit tension or unit pressure, the amount of pressure exerted by outer contact surface 154 of annular member 140 against inner cylindrical wall 23, seals outer contact surface 154 against inner cylindrical wall 23. Due to the inherent characteristic of annular member 140, tendency to expand, outer contact surface 140 is prone to wear away against inner cylindrical sidewall 23. Grooves 180 partially relieve the inherent tendency of annular member 140 to expand, the unit tension or unit pressure of annular member 140, when installed. At the same time, the tension annular member 140 retains when installed is sufficient to urge outer contact surface 154 of annular member 140 into sealing engagement against inner cylindrical sidewall 23 of first member 20 while reducing the tendency of outer contact surface 154 to wear prematurely.

In FIG. 11, grooves 180 are spaced-apart along the length of annular member 140 between end 172 and end 174. Grooves 180 are equally spaced apart in this example and are formed transversely to annular member 140 on an axial line of annular member 140, although they can extend diagonally at an angle to the axial line of annular member 140 in an alternate embodiment. Grooves 180 are identical in size and in shape and are each formed across radial notch surface 162, inner notch surface 164, and partially across second radial surface 152 from inner surface 156 of annular member 140 to an intermediate position between inner notch surface 164 and outer contact surface 154 in FIGS. 13, 14, and 15.

Figure 14:
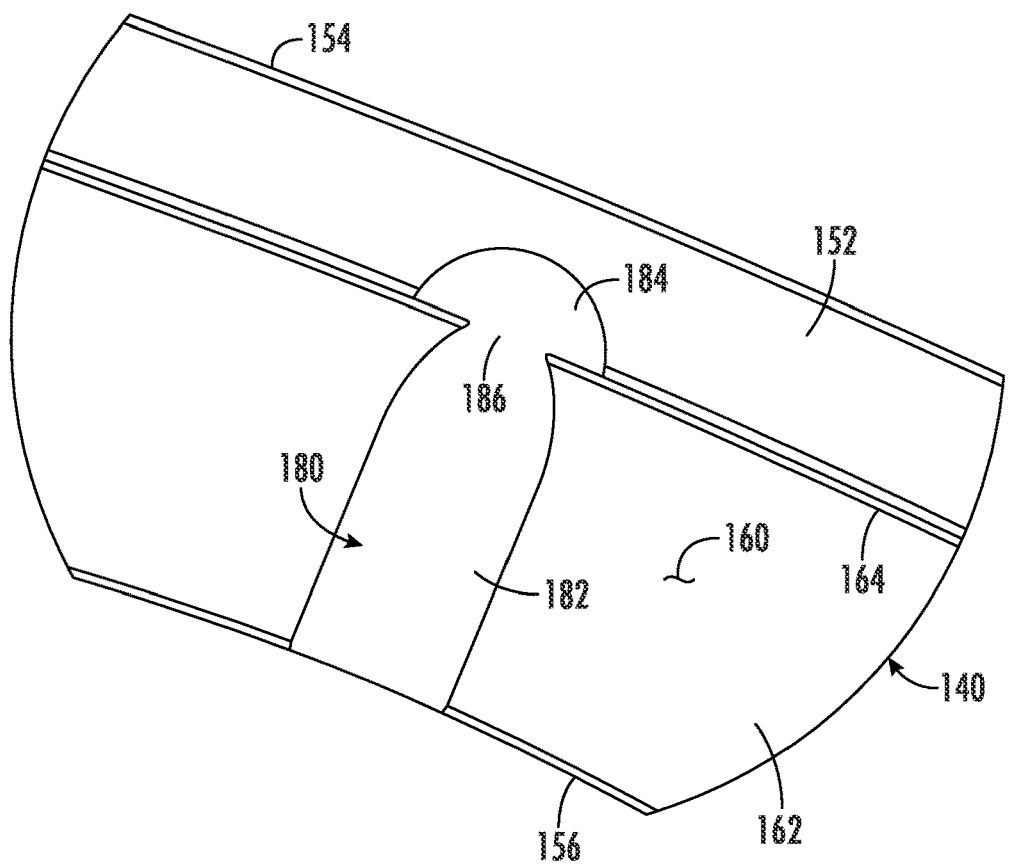
FIG. 14 is an enlarged, fragmentary top plan view of the seal of FIG. 11.
Figure 15:
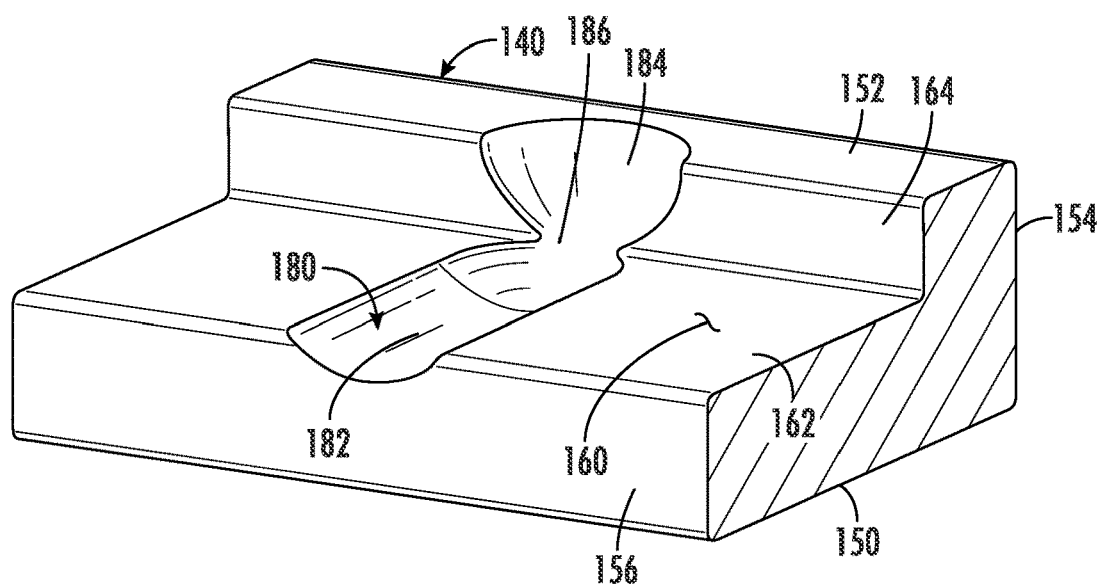
FIG. 15 is an enlarged, fragmentary perspective view of the seal of FIG. 11.

Referring to FIGS. 13, 14, and 15, each groove 180 includes a channel section 182, a hemispherical section 184, and a waist section 186 therebetween. Channel section 182 extends across radial notch surface 162 from inner surface 156 to waist section 186 proximate to inner notch surface 164. Hemispherical section 184 extends across second radial surface 152 from waist section 186 to the intermediate position between inner notch surface 164 and outer contact surface 154. Waist section 186 is narrow relative channel section 182 and to hemispherical section 184, is open to channel section 182 and hemispherical section 184 on either side thereof, and defines a narrowed or constriction point of groove 180 between channel section 182 and hemispherical section 184.

Channel section 182 is an entirely rounded bottom extending inwardly from radial notch surface 162 for inhibiting crack propagation therefrom in annular member 140 when it is tensioned. Channel section 182 extends axially into second axial thickness T5 from radial notch surface 162 from inner surface 156 to inner notch surface 164 where it tapers to waist section 186. Hemispherical section 184 is rounded for inhibiting crack propagation therefrom in annular member 140 when it is tensioned, and extends partially into radial thickness T6 and first axial thickness T4 of rail stop 176 from inner notch surface 164 and second radial surface 154, respectively. Each groove 180 imparts flexibility and tension-relieving properties to annular member 140 according to the discussion of annular members 50 and 50' of the respective seal assemblies 40 and 120 without the liability of annular member 140 breaking when tensioned throughout its operating life, from being too flexible, from being too flexible in the region of each groove 180, from losing its ability to seat and seal, and to ensure that grooves 180 work in coordination with each other to impart the desired conforming and tension-relieving properties in annular member 140 and in the region of each groove 180.

In other words, grooves 180 are configured to impart-flexibly-conforming and tension-relieving properties to annular member 140 to enable it to seat and seal upon and following installation while disabling annular member 140 from becoming too flexible and under-tensioned. To prevent annular member 140 from becoming too flexible and under-tensioned, including in the region of each groove 180, each groove 110 extends axially into second axial thickness T5 no more than from twenty-one to twenty-eight percent of second axial thickness T5, and hemispherical section 182 extends axially into first axial thickness T4 no more than fifty percent of first axial thickness T4 and radially into radial thickness T6 no more than fifty percent of radial thickness T6.

Each groove 180 is a relief, or tension-relieving groove, cut or machined into radial notch surface 162, inner notch surface 164, and second radial surface 152 of annular member 140, such as with a milling tool. Each groove 180 imparts the conforming and tension-relieving properties to annular member 140 when installed with members 20 and 22. The sum of grooves 180 cooperate to impart the conforming and tension-relieving properties to annular member 140 along its length from end 172 to end 174 on either side of end gap 170 when annular member 140 is installed. The unit tension or unit pressure, is the amount of pressure exerted by outer contact surface 154 against inner cylindrical sidewall 23 by annular member 140, is reduced by grooves 180 for favorably influencing outer contact surface 154 wear against and conforming to inner cylindrical surface 23. The reduction in unit tension or unit pressure in this embodiment is from ten to twenty-five percent of the unit tension or pressure of a companion piston ring seal having no such grooves.

In FIG. 11, grooves 180 are equally spaced-apart circumferentially along the length of annular member 140 between end 172 and 174, which imparts constant conforming and tension-relieving properties to annular member 140 from end 172 to end 174. In this example, annular member 140 is formed with fifteen grooves 180. This arrangement and number of grooves 180 in this example imparts the conforming and tension-relieving properties to annular member 140 when seal 140 is installed with members 20 and 22 for favorably influencing wear of outer contact surface 154 against inner cylindrical outer surface 23. At the same time, annular member 140 retains a sufficient tendency to expand when tensioned to urge outer contact 154 surface against inner cylindrical sidewall 23 of first member 20 with sufficient pressure to produce a sealing engagement therebetween. The tension-relieving property grooves 180 impart lessens the pressure or force between outer contact surface 154 and inner cylindrical sidewall 23 favorably influencing wear of outer contact surface 154. The reduced pressure of outer contact surface 154 against inner cylindrical sidewall 23 reduces wear of outer contact surface 154 favorably influencing the operating life of annular member 140, and reduces friction between outer contact surface 154 and inner cylindrical sidewall 23. This favorably influences the ability of first and second member 20 and 21 to reciprocate relative to one another favorably influencing increased power and improved gas mileage in internal combustion engines.

Like the previously-described grooves 110, grooves 180 impart to annular member 140 the conforming property. The conforming property of annular member 140 enables it to flexibly and constantly conform outer contact surface 154 to inner cylindrical sidewall 23 of first member 20, even when the bore or cylinder, first member 20, is not perfectly round, eliminating prolonged break-in. The inherent conforming property grooves 180 impart to annular member 140 enable it to seat and seal outer contact surface 154 against inner cylindrical sidewall 23 with little or no break-in and little or no physical wearing of outer contact surface 154 into inner cylindrical sidewall 23. Accordingly, the conforming property grooves 180 supply to annular member 140 causes outer contact surface 154 to seat and seal to inner cylindrical wall 23 upon installation of annular member 140 with first member 20 and second member 22, and to constantly conform and seal to the inner cylindrical sidewall 23 during operation.

The conforming and tension-relieving properties the sum of grooves 180 impart to annular member 140 is a function of the described relative dimension of grooves 180 and the number of grooves 180 and the spacing between adjacent grooves 180. The properties increase as the number of grooves 180 and the distance between the grooves 180 decreases, and decrease as the number of grooves 180 decreases and the distance between the grooves 180 increases. In annular member 140, the number of grooves 180 and the distance or spacing between each groove 180 and an adjacent groove 180 are chosen to produce a preselected tension-relieving property, a net unit tension or pressure, and flexibility in annular member 140, in this example approximately twenty percent of the unit tension or pressure of a companion piston ring having no such grooves 180. Any desired number of grooves 180 can be used and any selected spacing can be used between adjacent grooves 180, including equal spacings, or variable spacings, including a preselected combination of equal and variable spacings, set annular member 140 to a preselected flexibility and unit tension or pressure.

With all piston rings, gas tends to be forced into groove 25 during operation, especially by the force of explosion/expansion of fuel and oil components in the cylinder. The described configuration of grooves 180 enables them to buffer any gas that accumulates in groove 25. Referring to FIG. 13, gas forced into the back of ring groove 25 can pass into channel section 182 and through waist section 186 from channel section 182 to hemispherical section. Channel section 182 funnels the gas to waist section 186. Since waist section 186 is comparatively narrow compared to both channel section 182 and hemispherical section 184, waist section 186 restricts the flowing of gas from channel section 182 and releases it into the comparatively large hemispherical section 184, buffering the gas suppressing the tendency of the gas to expand annular member 140 and increase its tension against inner cylindrical sidewall 23, according to the principle of the invention. Accordingly, the configuration of each groove 180 is chosen not as a matter of mere design choice.

The present invention is described above with reference to illustrative embodiments. However, those skilled in the art will recognize that changes and modifications may be made in the described embodiments without departing from the nature and scope of the present invention. Various further changes and modifications to the embodiments herein chosen for illustration purposes will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. A seal assembly to be received within an annular groove having opposed radial surfaces and carried by one of a pair of relatively reciprocally movable members for sealing engagement with a sidewall of the other of said pair of relatively reciprocally movable members and for minimizing fluid leakage between said members, said seal assembly comprising:

a tensionable annular member including a first radial surface for residing adjacent to one of the radial surfaces of said groove, a second radial surface, an inner surface, an outer contact surface engageable with said sidewall, a first end gap severing said tensionable annular member and defining spaced-apart first and second ends thereof, a length from the first end to the second end, and grooves, the grooves are formed across the first radial surface from the outer contact surface to the inner surface of the tensionable annular member, are spaced-apart along the length of the tensionable annular member between the first end and the second end, and each said groove comprises a rounded bottom; and a gap seal annular member including a first radial surface for residing in juxtaposition with said tensionable annular member, a second radial surface for residing adjacent to the other of the radial surfaces of said groove, an inner surface, an outer contact surface engageable with said sidewall, and a second gap severing said gap seal annular member and defining spaced-apart first and second ends thereof.

2. The seal assembly according to claim 1, wherein:

the tensionable annular member includes an annular notch defined by a radial notch surface extending from the outer contact surface thereof to an inner notch surface extending from the second radial surface thereof; and the gap seal annular member is sized to be received in said annular notch.

3. The seal assembly according to claim 2, additionally comprising:

a first axial thickness between the first radial surface and the second radial surface;

a second axial thickness between the first radial surface and the radial notch surface;

the first axial thickness is greater than the second axial thickness; and each said groove extends axially from the first radial surface into a) the first axial thickness from thirteen to fifteen percent of the first axial thickness and b) the second axial thickness from twenty-one to twenty-three percent of the second axial thickness.

4. The seal assembly according to claim 3, wherein the rounded bottom of each said groove has a groove depth and a groove radius, and the groove radius is greater than the groove depth.

5. The seal assembly according to claim 2, wherein the outer contact surface of the gap seal annular member is more resistant to frictional wear than the outer contact surface of the tensionable annular member.

6. The seal assembly according to claim 1, wherein said grooves are equally sized.

7. A seal assembly to be received within an annular groove having opposed radial surfaces and carried by one of a pair of relatively reciprocally movable members for sealing engagement with a sidewall of the other of said pair of relatively reciprocally movable members and for minimizing fluid leakage between said members, said seal assembly comprising:

a tensionable annular member including a first radial surface for residing adjacent to one of the radial surfaces of said groove, a second radial surface, an inner surface, an outer contact surface engageable with said sidewall, a first end gap severing said tensionable annular member and defining spaced-apart first and second ends thereof, a length from the first end to the second end, grooves formed across the first radial surface from the outer contact surface to the inner surface of the tensionable annular member, and notches formed across the inner surface of the tensionable annular member from the first radial surface to the second radial surface, the grooves are spaced-apart along the length of the tensionable annular member between the first end and the second end and each said groove comprises a rounded bottom, and the notches are spaced-apart along the length of the tensionable annular member between the first end and the second end and each said notch comprises opposed first and second side surfaces that extend radially inward from the inner surface of the tensionable annular member to a blunt notch tip; and a gap seal annular member including a first radial surface for residing in juxtaposition with said tensionable annular member, a second radial surface for residing adjacent to the other of the radial surfaces of said groove, an outer contact surface engageable with said sidewall, and a second gap severing said gap seal annular member and defining spaced-apart first and second ends thereof.

8. The seal assembly according to claim 7, wherein:

the tensionable annular member includes an annular notch defined by a radial notch surface extending from the outer contact surface thereof to an inner notch surface extending from the second radial surface thereof; and the gap seal annular member is sized to be received in said annular notch.

9. The seal assembly according to claim 8, additionally comprising:

a first axial thickness between the first radial surface and the second radial surface;

a second axial thickness between the first radial surface and the radial notch surface;

the first axial thickness is greater than the second axial thickness; and each said groove extends axially from the first radial surface into a) the first axial thickness from thirteen to fifteen percent of the first axial thickness and b) the second axial thickness from twenty-one to twenty-three percent of the second axial thickness.

10. The seal assembly according to claim 9, wherein the rounded bottom of each said groove has a groove depth and a groove radius, and the groove radius is greater than the groove depth.

11. The seal assembly according to claim 10, additionally comprising a radial thickness between the inner surface of the tensionable annular member and the inner notch surface, and each said notch extends radially from the inner surface of the tensionable annular member into the radial thickness no more than fifty percent of the radial thickness.

12. The seal assembly according to claim 7, wherein the outer contact surface of the gap seal annular member is more resistant to frictional wear than the outer contact surface of the tensionable annular member.

13. The seal assembly according to claim 7, wherein said grooves are equally sized.

14. The seal assembly according to claim 7, wherein each said groove is between adjacent notches, and no one of said notches is in-line with, formed with, or intersects any one of said grooves.

15. The seal assembly according to claim 7, wherein said notches are equally sized.

16. A seal to be received within an annular groove having opposed radial surfaces and carried by one of a pair of relatively reciprocally movable members for sealing engagement with a sidewall of the other of said pair of relatively reciprocally movable members and for minimizing fluid leakage between said members, said seal comprising:

a tensionable annular member including a first radial surface for residing adjacent to one of the radial surfaces of said groove, a second radial surface, an inner surface, an outer contact surface engageable with said sidewall, an end gap severing said tensionable annular member and defining spaced-apart first and second ends thereof, a length from the first end to the second end, an annular notch defined by a radial notch surface extending from the inner surface thereof to an inner notch surface extending from the second radial surface thereof, grooves formed across the radial notch surface, the inner notch surface, and the second radial surface from the inner surface of the tensionable annular member to an intermediate position between the inner notch surface and the outer contact surface, and the grooves are spaced-apart along the length of the tensionable annular member between the first end and the second end.

17. The seal according to claim 16, wherein each said groove comprises a channel section, a hemispherical section, and a waist section therebetween, wherein the channel section extends across the radial notch surface from the inner surface of the tensionable annular member to the waist section proximate to the inner notch surface, and the hemispherical section extends across the second radial surface from the waist section to the intermediate position.

18. The seal according to claim 17, wherein the channel section comprises a rounded bottom.

19. The seal according to claim 17, wherein the waist section is narrow relative to the channel section and to the hemispherical section.

20. The seal according to claim 16, wherein said grooves are equally sized.

* * * * *